US010995754B2

(12) United States Patent
Doepker et al.

(10) Patent No.: US 10,995,754 B2
(45) Date of Patent: May 4, 2021

(54) CO-ROTATING COMPRESSOR

(71) Applicant: Emerson Climate Technologies, Inc., Sidney, OH (US)

(72) Inventors: Roy J. Doepker, Lima, OH (US); Robert C. Stover, Versailles, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 387 days.

(21) Appl. No.: 15/877,870

(22) Filed: Jan. 23, 2018

(65) Prior Publication Data
US 2018/0223848 A1 Aug. 9, 2018

Related U.S. Application Data

(60) Provisional application No. 62/455,188, filed on Feb. 6, 2017.

(51) Int. Cl.
*F04C 28/18* (2006.01)
*F04C 28/28* (2006.01)
(Continued)

(52) U.S. Cl.
CPC ............ *F04C 28/18* (2013.01); *F04C 23/008* (2013.01); *F04C 28/28* (2013.01); *H02K 7/14* (2013.01);
(Continued)

(58) Field of Classification Search
CPC .... F16C 32/04; F16C 32/0406; F16C 32/044; H02K 7/09; F04C 23/007; F04C 28/28; F04C 2240/50; F04C 28/18
See application file for complete search history.

(56) References Cited

U.S. PATENT DOCUMENTS 2,415,011 A   1/1947 Hubacker
2,420,124 A   5/1947 Coulson
(Continued)

FOREIGN PATENT DOCUMENTS

CN  101682226 A  3/2010
CN  102480197 A  5/2012
(Continued)

OTHER PUBLICATIONS

Author: Design World Staff Title: New Levels of Perfomance with magnetic bearings Date published: Oct. 8, 2010 Date accessed: Apr. 6, 2020 Link: https://www.designworldonline.com/new-levels-of-performance-with-magnetic-bearings/ (Year: 2010).*
(Continued)

*Primary Examiner* — Charles G Freay
*Assistant Examiner* — Chirag Jariwala
(74) *Attorney, Agent, or Firm* — Harness, Dickey & Pierce, P.L.C.

(57) ABSTRACT

A compressor may include first and second compression members, first and second bearing assemblies, a sensor, and processing circuitry. The second compression member cooperates with the first compression member to define a compression pocket. The first and second bearing assemblies rotatably support the first and second compression members, respectively. The first bearing assembly may include a bearing rotor and a bearing stator. The bearing stator may surround the bearing rotor and may include poles each having a winding. The sensor may measure a radial position of the bearing rotor relative to the bearing stator. The processing circuitry may be in communication with the sensor and may control electrical current supplied to the windings based on the radial position measured by the sensor to adjust the radial position of the bearing rotor relative to the bearing stator.

25 Claims, 7 Drawing Sheets

(51) Int. Cl.
*H02K 7/14* (2006.01)
*F04C 23/00* (2006.01)
*F04C 18/02* (2006.01)

(52) U.S. Cl.
CPC ........ *F04C 18/023* (2013.01); *F04C 2240/40* (2013.01); *F04C 2240/50* (2013.01); *F04C 2270/175* (2013.01)

(56) References Cited

U.S. PATENT DOCUMENTS

| | | | |
|---|---|---|---|
| 2,440,593 | A | 4/1948 | Miller |
| 4,105,374 | A | 8/1978 | Scharf |
| 4,753,582 | A | 6/1988 | Morishita et al. |
| 4,781,550 | A | 11/1988 | Morishita et al. |
| 4,846,639 | A | 7/1989 | Morishita et al. |
| 4,927,340 | A | 5/1990 | McCullough |
| 4,950,135 | A | 8/1990 | Tojo et al. |
| 5,002,470 | A | 3/1991 | Gormley et al. |
| 5,051,075 | A | 9/1991 | Young |
| 5,073,093 | A | 12/1991 | Takagi et al. |
| 5,090,876 | A | 2/1992 | Hashizume et al. |
| 5,099,658 | A | 3/1992 | Utter et al. |
| 5,123,818 | A | 6/1992 | Gormley et al. |
| 5,129,798 | A | 7/1992 | Crum et al. |
| 5,141,421 | A | 8/1992 | Bush et al. |
| 5,149,255 | A | 9/1992 | Young |
| 5,178,526 | A | 1/1993 | Galante et al. |
| 5,211,031 | A | 5/1993 | Murayama et al. |
| 5,256,042 | A | 10/1993 | McCullough et al. |
| 5,256,044 | A | 10/1993 | Nieter et al. |
| 5,263,822 | A | 11/1993 | Fujio |
| 5,277,563 | A | 1/1994 | Wen-Jen et al. |
| 5,328,341 | A | 7/1994 | Forni |
| 5,449,279 | A | 9/1995 | Hill et al. |
| 5,490,769 | A * | 2/1996 | Calhoun ............... F04C 18/023 418/1 |
| 5,713,731 | A | 2/1998 | Utter et al. |
| 5,791,883 | A | 8/1998 | Ban et al. |
| 6,359,357 | B1 | 3/2002 | Blumenstock |
| 6,616,430 | B2 | 9/2003 | Mori et al. |
| 6,692,205 | B2 | 2/2004 | Moroi et al. |
| 6,712,589 | B2 * | 3/2004 | Mori ..................... F01C 17/063 417/410.5 |
| 6,993,910 | B2 | 2/2006 | Iwanami et al. |
| 7,201,567 | B2 | 4/2007 | Wiertz et al. |
| 7,344,367 | B2 | 3/2008 | Manole |
| 8,007,260 | B2 | 8/2011 | Yanagisawa |
| 8,058,762 | B2 | 11/2011 | Asano |
| 8,179,016 | B2 | 5/2012 | Asano |
| 8,323,006 | B2 | 12/2012 | Schofield et al. |
| 8,373,326 | B2 | 2/2013 | Enomoto et al. |
| 8,894,388 | B2 | 11/2014 | Lee et al. |
| 9,169,841 | B2 | 10/2015 | Bonnefoi et al. |
| 9,534,599 | B2 | 1/2017 | Rosson et al. |
| 2002/0182094 | A1 | 12/2002 | Mori et al. |
| 2005/0031465 | A1 | 2/2005 | Dreiman et al. |
| 2005/0201884 | A1 | 9/2005 | Dreiman |
| 2008/0087033 | A1 | 4/2008 | Bae et al. |
| 2009/0104060 | A1 | 4/2009 | Sato et al. |
| 2010/0164313 | A1 | 7/2010 | Langford et al. |
| 2010/0225195 | A1 | 9/2010 | Asano et al. |
| 2011/0002797 | A1 | 1/2011 | Takeuchi et al. |
| 2011/0038737 | A1 | 2/2011 | Conry et al. |
| 2012/0131945 | A1 | 5/2012 | Huang et al. |
| 2012/0171060 | A1 | 7/2012 | Shin et al. |
| 2013/0036762 | A1 | 2/2013 | Shaffer et al. |
| 2013/0181565 | A1 | 7/2013 | Petro et al. |
| 2014/0361651 | A1 | 12/2014 | Park et al. |
| 2016/0043602 | A1 | 2/2016 | Hosek et al. |
| 2017/0051741 | A1 | 2/2017 | Shaffer et al. |
| 2018/0013336 | A1 | 1/2018 | Li |
| 2018/0080446 | A1 | 3/2018 | Choi et al. |
| 2018/0087509 | A1 * | 3/2018 | Johnson ............... F04C 18/16 |
| 2018/0223842 | A1 | 8/2018 | Stover et al. |
| 2018/0223843 | A1 | 8/2018 | Doepker et al. |
| 2018/0223849 | A1 | 8/2018 | Doepker et al. |
| 2018/0224171 | A1 | 8/2018 | Doepker et al. |
| 2018/0363654 | A1 | 12/2018 | Doepker et al. |

FOREIGN PATENT DOCUMENTS

| | | | |
|---|---|---|---|
| CN | 103807166 A | 5/2014 | |
| CN | 105971880 A | 9/2016 | |
| EP | 0534891 A1 | 3/1993 | |
| JP | S52210279 A | 9/1987 | |
| JP | H02140477 A | 5/1990 | |
| JP | H02207190 A | 8/1990 | |
| JP | H06213232 A | 8/1994 | |
| JP | H0712076 A | 1/1995 | |
| JP | 07229481 A * | 8/1995 | .......... F04C 29/0085 |
| JP | H07229481 A | 8/1995 | |
| JP | 2004052657 A | 2/2004 | |
| JP | 2015004296 A | 1/2015 | |
| JP | 2015124653 A | 7/2015 | |
| KR | 1019910001253 | 1/1991 | |
| KR | 20110000545 A | 1/2011 | |
| KR | 20120069713 A | 6/2012 | |
| KR | 20150006278 A | 1/2015 | |
| KR | 20160091106 A | 8/2016 | |
| TW | 223674 B | 5/1994 | |
| WO | WO-2018116696 A1 | 6/2018 | |
| WO | WO-2018134739 A1 | 7/2018 | |

OTHER PUBLICATIONS

Author: McMullen et al. Title: Combination Radial-Axial Magnetic Bearing Date published: Aug. 2000 Date accessed: Apr. 6, 2020 Link: https://repositories.lib.utexas.edu/handle/2152/33066 (Year: 2000).*
Frank, et al., NASA Tech Briefs, Ring Motors—Design Flexibility for Innovative Configurations, Sep. 1, 2014.
McMullen, et al., Combination Radial-Axial Magnetic Bearing, Seventh International Symp. on Magnetic Bearings, Aug. 23-25, 2000.
"Design of Electric Machines: Axial Flux Machines," Electric Energy Magazine No. 4, Jan.-Jun. 2013, 23 pages.
Mahmoudi, Rahim and Hew, "Axial-flux permanent-magnet machine modeling, design, simulation and analysis," Scientific Research and Essays vol. 6 (12), Jun. 18, 2011, pp. 2525-2549.
U.S. Appl. No. 16/284,653, filed Feb. 25, 2019, Robert C. Stover et al.
Office Action regarding U.S. Appl. No. 16/114,912, dated Dec. 3, 2018.
Election Requirement regarding U.S. Appl. No. 15/425,319, dated Jan. 10, 2019.
Notice of Allowance regarding U.S. Appl. No. 15/425,428, dated Feb. 15, 2019.
Office Action regarding Korean Patent Application No. 10-2018-0013623, dated Feb. 18, 2019. Translation provided by KS KORYO International IP Law Firm.
Office Action regarding U.S. Appl. No. 15/205,907, dated May 29, 2018.
International Search Report of the ISA regarding International Patent Application No. PCT/US2018/017069, dated Jun. 12, 2018.
Written Opinion of the ISA regarding International Patent Application No. PCT/US2018/017069, dated Jun. 12, 2018.
U.S. Appl. No. 16/114,912, filed Aug. 28, 2018, Roy J. Doepker et al.
Election/Restriction Requirement regarding U.S. Appl. No. 15/425,428, dated Aug. 8, 2018.
Office Action regarding U.S. Appl. No. 15/425,428, dated Nov. 1, 2018.
Notice of Allowance regarding U.S. Appl. No. 15/425,374, dated Nov. 7, 2018.
Office Action regarding Chinese Patent Application No. 201810116198.8, dated Feb. 26, 2019. Translation provided by Unitalen Attorneys at Law.

(56) References Cited

OTHER PUBLICATIONS

Office Action regarding Korean Patent Application No. 10-2018-0013620, dated Feb. 26, 2019. Translation provided by KS KORYO International IP Law Firm.
Office Action regarding Chinese Patent Application No. 201810119087.2, dated Feb. 27, 2019. Translation provided by Unitalen Attorneys at Law.
Office Action regarding Chinese Patent Application No. 201810118025.X, dated Mar. 4, 2019. Translation provided by Unitalen Attorneys at Law.
Office Action regarding Korean Patent Application No. 10-2018-0013622, dated Mar. 20, 2019. Translation provided by KS KORYO International IP Law Firm.
Office Action regarding Chinese Patent Application No. 201810119178.6, dated Mar. 21, 2019. Translation provided by Unitalen Attorneys at Law.
Office Action regarding Korean Patent Application No. 10-2018-0013621, dated Mar. 25, 2019. Translation provided by KS KORYO International IP Law Firm.
Office Action regarding U.S. Appl. No. 16/114,912, dated Mar. 28, 2019.
Office Action regarding U.S. Appl. No. 15/425,319, dated Apr. 1, 2019.
Partial Search Report regarding European Patent Application No. 18155358.7, dated Jun. 27, 2018.
Search Report regarding European Patent Application No. 18155363.7, dated Jul. 2, 2018.
Search Report regarding European Patent Application No. 18155362.9, dated Jul. 2, 2018.
Office Action regarding U.S. Appl. No. 15/425,374, dated Jul. 27, 2018.
Hasegawa, Hiroshi et al., "Dynamic Analysis of a Co-Rotating Scroll Compressor." International Compressor Engineering Conference, Paper 1313, pp. 643-648 (1998).
Office Action regarding Mexican Patent Application No. MX/a/2017/008998, dated Oct. 1, 2019. Translation provided by Panamericana de Patentes y Marcas, S.C.
Office Action regarding Chinese Patent Application No. 201880016172.4, dated Jul. 1, 2020. Translation provided by Unitalen Attorneys at Law.
Office Action regarding Chinese Patent Application No. 201710551365.7, dated Jul. 3, 2020. Summary translation provided by Zhongzi Law Office.
Office Action regarding U.S. Appl. No. 16/284,653, dated Jul. 29, 2019.
Notice of Allowance regarding U.S. Appl. No. 15/425,319, dated Aug. 7, 2019.
Office Action regarding U.S. Appl. No. 15/205,907, dated Aug. 9, 2019.
Office Action regarding Chinese Patent Application No. 201810116198.8, dated Aug. 26, 2019. Translation provided by Unitalen Attorneys at Law.
Office Action regarding Chinese Patent Application No. 201810118025.X, dated Aug. 28, 2019. Translation provided by Unitalen Attorneys at Law.
Office Action regarding Indian Patent Application No. 201824003471, dated Sep. 11, 2019.
Office Action regarding U.S. Appl. No. 15/425,266, dated Oct. 8, 2019.
Office Action regarding Chinese Patent Application No. 201810119178.6, dated Oct. 18, 2019. Translation provided by Unitalen Attorneys at Law.
Office Action regarding Chinese Patent Application No. 201810118025.X, dated Feb. 25, 2020. Translation provided by Unitalen Attorneys at Law.
Notice of Allowance regarding U.S. Appl. No. 16/284,653, dated Mar. 12, 2020.
Office Action regarding U.S. Appl. No. 15/425,266, dated Apr. 3, 2020.
Office Action regarding U.S. Appl. No. 15/425,266, dated Jul. 6, 2020.
Office Action regarding European Application No. 18155358.7 dated Oct. 6, 2020.

\* cited by examiner

CO-ROTATING COMPRESSOR

CROSS-REFERENCE TO RELATED APPLICATIONS

This application claims the benefit of U.S. Provisional Application No. 62/455,188, filed on Feb. 6, 2017. The entire disclosure of the above application is incorporated herein by reference.

FIELD

The present disclosure relates to a compressor, and more particularly, to a co-rotating compressor.

BACKGROUND

This section provides background information related to the present disclosure and is not necessarily prior art.

A compressor may be used in a refrigeration, heat pump, HVAC, or chiller system (generically, "climate control system") to circulate a working fluid therethrough. The compressor may be one of a variety of compressor types. For example, the compressor may be a scroll compressor, a rotary-vane compressor, a reciprocating compressor, a centrifugal compressor, or an axial compressor. Some compressors include a motor assembly that rotates a driveshaft. In this regard, compressors often utilize a motor assembly that includes a stator surrounding a central rotor that is coupled to the driveshaft below the compression mechanism. Regardless of the exact type of compressor employed, consistent and reliable operation of the compressor is desirable to effectively and efficiently circulate the working fluid through the climate control system. The present disclosure provides an improved compressor having a motor assembly and bearing assemblies that efficiently and effectively drives the compression mechanism while reducing the overall size of the compressor.

SUMMARY

This section provides a general summary of the disclosure, and is not a comprehensive disclosure of its full scope or all of its features.

The present disclosure provides a compressor that may include a first compression member, a second compression member, a first bearing assembly, a second bearing assembly, a gap sensor, and processing circuitry. The second compression member cooperates with the first compression member to define a compression pocket therebetween. The first bearing assembly may support the first compression member for rotation about a first rotational axis. The first bearing assembly may include an annular bearing rotor and an annular bearing stator. The bearing stator may surround the bearing rotor and may include a plurality of poles each having a winding. The second bearing assembly may support the second compression member for rotation about a second rotational axis that is parallel to the first rotational axis and offset from the first rotational axis. The gap sensor may measure a radial position of the bearing rotor relative to the bearing stator. The processing circuitry may be in communication with the gap sensor and may control electrical current supplied to the windings based on the radial position measured by the sensor to adjust the radial position of the bearing rotor relative to the bearing stator.

In some configurations, the compressor includes a plurality of gap sensors positioned around the circumference of the bearing rotor and each measuring a corresponding radial distance between the bearing rotor and the bearing stator. The processing circuitry may be in communication with the plurality of gap sensors and may control electrical current to the windings based on data received from the plurality of gap sensors.

In some configurations, the first compression member includes a first hub received in and fixed relative to the bearing rotor.

In some configurations, the second compression member includes a second hub rotatably supported by the second bearing assembly.

In some configurations, the compressor includes a motor assembly including a motor rotor engaging the first compression member and disposed axially between the first and second bearing assemblies.

In some configurations, the motor rotor surrounds a first end plate of the first compression member and a second end plate of the second compression member.

In some configurations, the first and second bearing assemblies are disposed within first and second bearing housings, respectively. The motor assembly may include a motor stator surrounding the motor rotor and disposed axially between the first and second bearing housings.

In some configurations, the motor rotor includes a radially extending portion that extends radially outward relative to the first rotational axis and an axially extending portion that extends parallel to the first rotational axis.

In some configurations, the axially extending portion engages the first end plate and surrounds the second compression member.

In some configurations, the compressor includes a seal engaging the motor rotor and the second end plate. The radially extending portion may engage the seal. The second end plate may be disposed between the first end plate and the radially extending portion in a direction extending along the first rotational axis.

In some configurations, the first and second compression members are first and second scroll members, respectively.

In some configurations, the bearing stator includes axial control windings in communication with the processing circuitry. The processing circuitry may control electrical current supplied to the axial control windings to adjust the axial position of the bearing rotor relative to the bearing stator.

The present disclosure also provides a compressor that may include a first compression member, a second compression member, a first magnetic bearing assembly, a second magnetic bearing assembly, a first gap sensor, a second gap sensor, and processing circuitry. The second compression member cooperates with the first compression member to define a compression pocket therebetween. The first magnetic bearing assembly may support the first compression member for rotation about a first rotational axis. The first magnetic bearing assembly may include an annular first bearing rotor and an annular first bearing stator. The first bearing stator may surround the first bearing rotor and may include a plurality of first poles each having a winding. The second magnetic bearing assembly may support the second compression member for rotation about a second rotational axis that is parallel to the first rotational axis and offset from the first rotational axis. The second magnetic bearing assembly may include an annular second bearing rotor and an annular second bearing stator. The second bearing stator may surround the second bearing rotor and including a plurality of second poles each having a winding. The first gap sensor may measure a radial position of the first bearing rotor relative to the first bearing stator. The second gap sensor may measure a radial position of the second bearing rotor relative to the second bearing stator. The processing circuitry may be in communication with the first and second gap sensors and may control electrical current supplied to the windings of the first and second poles based on the radial positions measured by the first and second sensors to adjust the radial positions of the first and second rotational axes relative to each other.

In some configurations, the compressor includes a plurality of first gap sensors positioned around the circumference of the first bearing rotor and each measuring a corresponding radial distance between the first bearing rotor and the first bearing stator; and a plurality of second gap sensors positioned around the circumference of the second bearing rotor and each measuring a corresponding radial distance between the second bearing rotor and the second bearing stator. The processing circuitry may be in communication with the plurality of first gap sensors and the plurality of second gap sensors and may control electrical current to the windings of the first and second bearing stators based on data received from the plurality of first gap sensors and the plurality of second gap sensors.

In some configurations, the first compression member includes a first hub received in and fixed relative to the first bearing rotor. The second compression member may include a second hub received in and fixed relative to the second bearing rotor.

In some configurations, the compressor includes a motor assembly including a motor rotor engaging the first compression member and disposed axially between the first and second bearing assemblies.

In some configurations, the motor rotor surrounds a first end plate of the first compression member and a second end plate of the second compression member.

In some configurations, the first and second magnetic bearing assemblies are disposed within first and second bearing housings, respectively. The motor assembly may include a motor stator surrounding the motor rotor and disposed axially between the first and second bearing housings.

In some configurations, the motor rotor includes a radially extending portion that extends radially outward relative to the first rotational axis and an axially extending portion that extends parallel to the first rotational axis.

In some configurations, the axially extending portion engages the first end plate and surrounds the second compression member.

In some configurations, the compressor includes a seal engaging the motor rotor and the second end plate. The radially extending portion may engage the seal. The second end plate may be disposed between the first end plate and the radially extending portion in a direction extending along the first rotational axis.

In some configurations, the first and second compression members are first and second scroll members, respectively.

The present disclosure also provides a compressor that may include first and second scroll members, a bearing assembly, and processing circuitry. The second scroll member cooperates with the first scroll member to define a compression pocket therebetween. The bearing assembly may support one of the first and second scroll members for rotation about a rotational axis. The bearing assembly may include an annular bearing rotor and an annular bearing stator. The bearing stator may surround the bearing rotor and may include axial control windings. The processing circuitry may control electrical current supplied to the axial control windings to adjust an axial position of the bearing rotor relative to the bearing stator.

In some configurations, the bearing rotor is fixedly attached to the one of the first and second scroll members.

In some configurations, the processing circuitry controls electrical current supplied to the axial control windings to axially move the one of the first and second scroll members relative to the other one of the first and second scroll members between a first position corresponding to a full-capacity state and a second position corresponding to a reduced-capacity state.

In some configurations, the bearing stator includes a plurality of poles each having a radial control winding. The processing circuitry may control electrical current supplied to the radial control windings to adjust a radial position of the bearing rotor relative to the bearing stator.

In some configurations, the one of the scroll members includes a hub. The bearing rotor may be fixedly attached to the hub.

In some configurations, the compressor includes a motor assembly including a motor rotor engaging the first scroll member. The motor rotor may surround a first end plate of the first scroll member and a second end plate of the second scroll member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
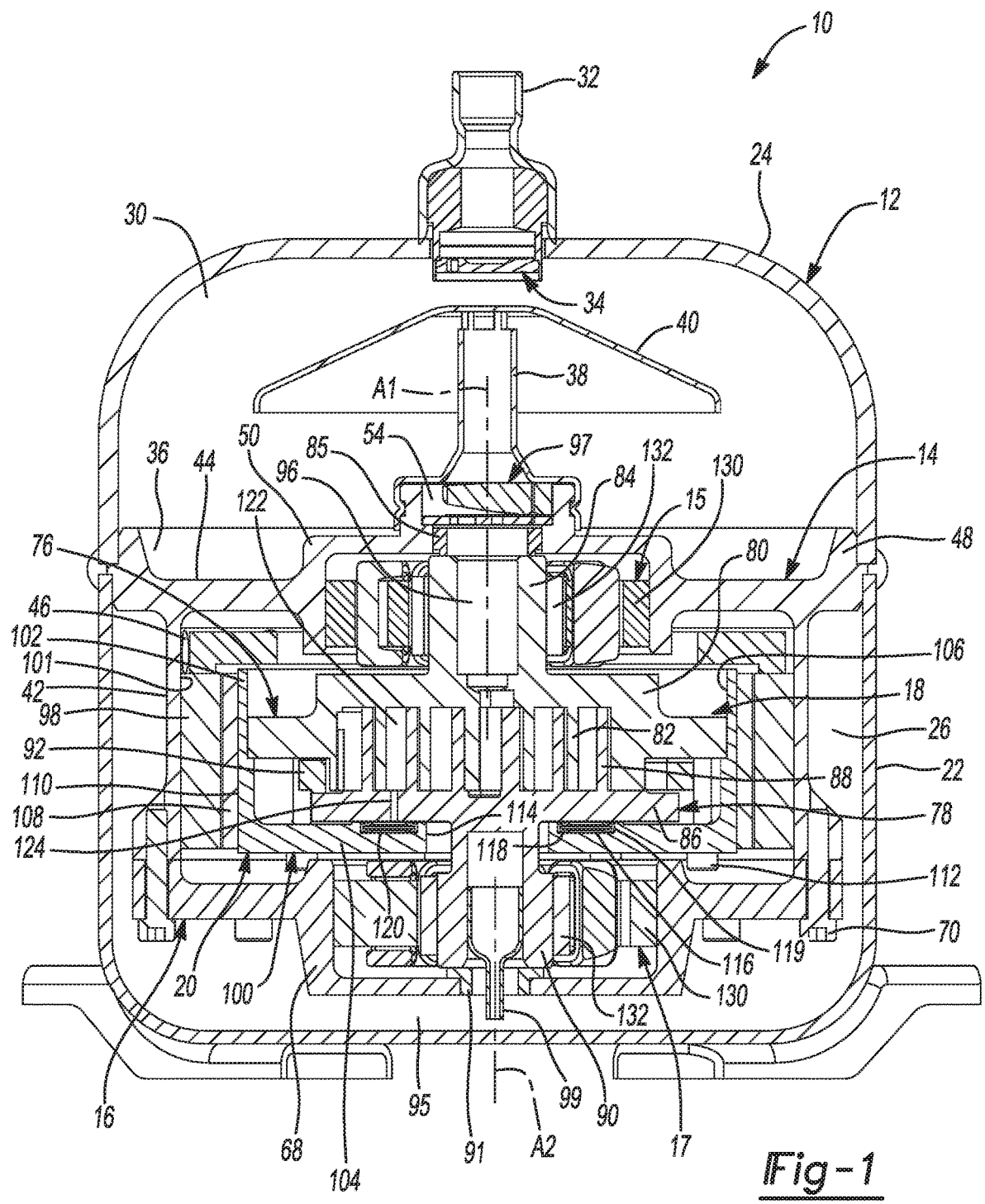
FIG. 1 is a cross-sectional view of a compressor according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
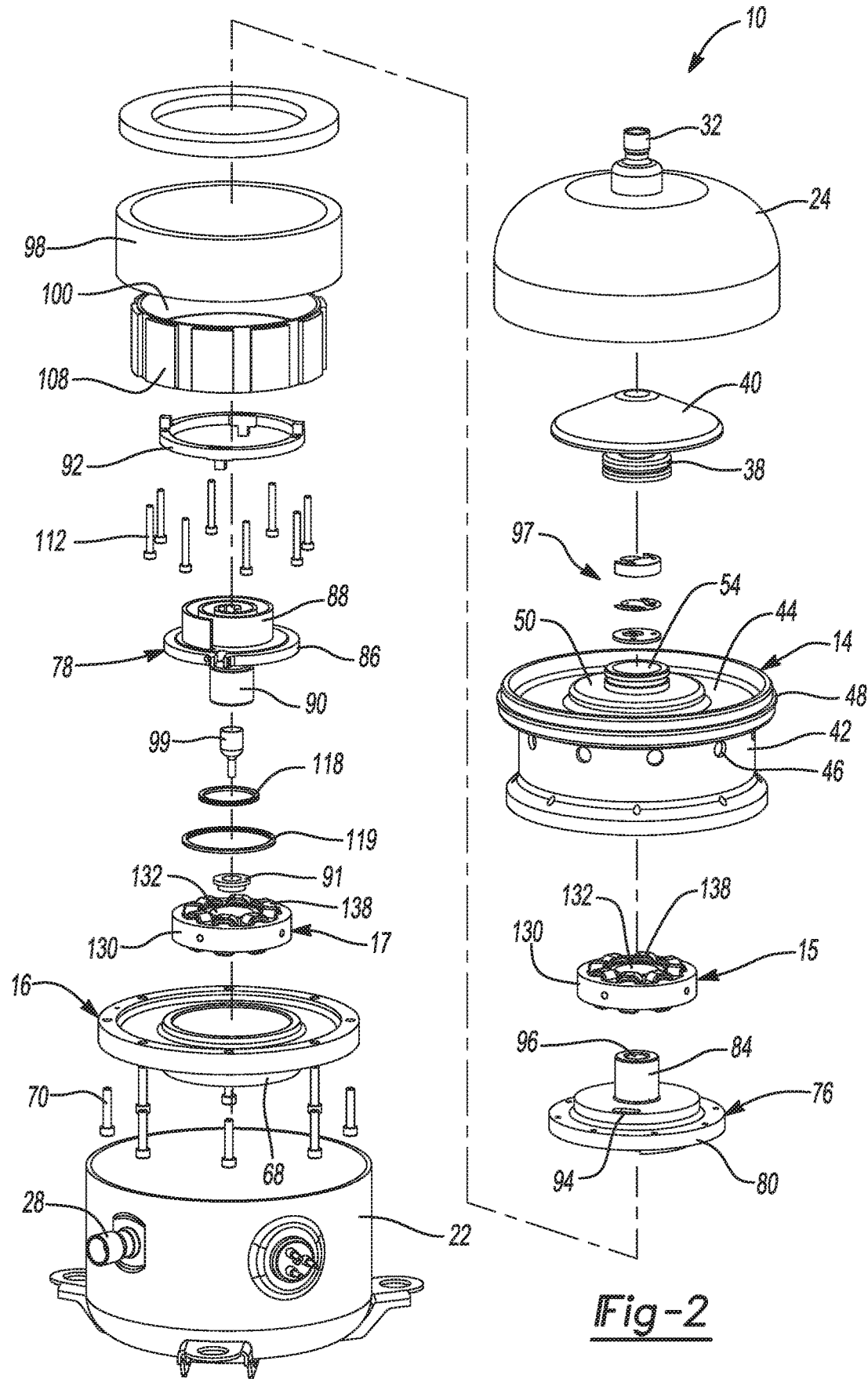
FIG. 2 is an exploded perspective view of the compressor of FIG. 1.

With reference to FIGS. 1 and 2, a compressor 10 is provided that may include a shell assembly 12, a first bearing housing 14, a first bearing assembly (e.g., a first magnetic bearing assembly) 15, a second bearing housing 16, a second bearing assembly (e.g., a second magnetic bearing assembly) 17, a compression mechanism 18, and a motor assembly 20. The shell assembly 12 may include a first shell body 22 and a second shell body 24. The first and second shell bodies 22, 24 may be fixed to each other and to the first bearing housing 14. The first shell body 22 and the first bearing housing 14 may cooperate with each other to define a suction chamber 26 in which the second bearing housing 16, the compression mechanism 18 and the motor assembly 20 may be disposed. A suction inlet fitting 28 (FIG. 2) may engage the first shell body 22 and may be in fluid communication with the suction chamber 26. Suction-pressure working fluid (i.e., low-pressure working fluid) may enter the suction chamber 26 through the suction inlet fitting 28 and may be drawn into the compression mechanism 18 for compression therein. The compressor 10 may be a low-side compressor (i.e., the motor assembly 20 and at least a majority of the compression mechanism 18 are disposed in the suction chamber 26).

The second shell body 24 and the first bearing housing 14 may cooperate with each other to define a discharge chamber 30. The first bearing housing 14 may sealingly engage the first and second shell bodies 22, 24 to separate the discharge chamber 30 from the suction chamber 26. A discharge outlet fitting 32 may engage the second shell body 24 and may be in fluid communication with the discharge chamber 30. Discharge-pressure working fluid (i.e., working fluid at a higher pressure than suction pressure) may enter the discharge chamber 30 from the compression mechanism 18 and may exit the compressor 10 through the discharge outlet fitting 32. In some configurations, a discharge valve 34 may be disposed within the discharge outlet fitting 32. The discharge valve 34 may be a check valve that allows fluid to exit the discharge chamber 30 through the discharge outlet fitting 32 and prevents fluid from entering the discharge chamber 30 through the discharge outlet fitting 32.

In some configurations, a high-side lubricant sump 36 may be disposed in the discharge chamber 30. That is, the second shell body 24 and the first bearing housing 14 may cooperate with each other to define the lubricant sump 36. A mixture of discharge-pressure working fluid and lubricant may be discharged from the compression mechanism 18 through a discharge pipe 38 mounted to the first bearing housing 14. The discharge pipe 38 may direct the mixture of discharge-pressure working fluid and lubricant to a lubricant separator 40 that separates the lubricant from the discharge-pressure working fluid. The separated lubricant may fall from the lubricant separator 40 into the lubricant sump 36 and the separated discharge-pressure working fluid may flow toward the discharge outlet fitting 32.

The first bearing housing 14 may include a generally cylindrical annular wall 42 and a radially extending flange portion 44 disposed at an axial end of the annular wall 42. The annular wall 42 may include one or more openings or apertures 46 (FIG. 2) through which suction-pressure working fluid in the suction chamber 26 can flow to the compression mechanism 18. The flange portion 44 may include an outer rim 48 that is welded to (or otherwise fixedly engages) the first and second shell bodies 22, 24. The flange portion 44 may include a central hub 50 that receives the first bearing assembly 15. The discharge pipe 38 may be mounted to the central hub 50. The central hub 50 may define a discharge passage 54 through which discharge-pressure working fluid flows from the compression mechanism 18 to the discharge pipe 38.

In some configurations (e.g., in configurations in which the first bearing assembly 15 is a conventional bearing assembly, rather than a magnetic bearing assembly), the first bearing housing 14 may include one or more lubricant passages (not shown) in fluid communication with the lubricant sump 36. A valve assembly (not shown) may be mounted to the first bearing housing 14 and may selectively allow and prevent lubricant to flow from the lubricant sump 36 and through the one or more lubricant passages to the first bearing assembly 15 and/or other components to cool and/or lubricate the first bearing assembly 15 and/or other components.

The second bearing housing 16 may be a generally disk-shaped member having a central hub 68 that receives the second bearing assembly 17. The second bearing housing 16 may be fixedly attached to an axial end of the annular wall 42 of the first bearing housing 14 via a plurality of fasteners 70, for example. In some configurations (e.g., in configurations in which the second bearing assembly 17 is a conventional bearing assembly, rather than a magnetic bearing assembly), the second bearing housing 16 may include one or more lubricant passages (not shown) in fluid communication with one or more lubricant passages (not shown) in the first bearing housing 14 to provide lubricant from the lubricant sump to the second bearing assembly 17, for example.

The compression mechanism 18 may include a first compression member and a second compression member that cooperate to compress working fluid therebetween. For example, the compression mechanism 18 may be a co-rotating scroll compression mechanism in which the first compression member is a first scroll member (e.g., a driven scroll member) 76 and the second compression member is a second scroll member (e.g., an idler scroll member) 78. In other configurations, the compression mechanism 18 could be another type of compression mechanism, such as an orbiting scroll compression mechanism, a rotary compression mechanism, a screw compression mechanism, a Wankel compression mechanism or a reciprocating compression mechanism, for example.

The first scroll member 76 may include a first end plate 80, a first spiral wrap 82 extending from one side of the first end plate 80, and a first hub 84 extending from the opposite side of the first end plate 80. The second scroll member 78 may include a second end plate 86, a second spiral wrap 88 extending from one side of the second end plate 86, and a second hub 90 extending from the opposite side of the second end plate 86. The first hub 84 of the first scroll member 76 is received within the central hub 50 of the first bearing housing 14 and is supported by the first bearing housing 14 and the first bearing assembly 15 for rotation about a first rotational axis A1 relative to the first and second bearing housings 14, 16. A seal 85 is disposed within the central hub 50 and sealing engages the central hub 50 and the first hub 84. The second hub 90 of the second scroll member 78 is received within the central hub 68 of the second bearing housing 16 and is supported by the second bearing housing 16 and the second bearing assembly 17 for rotation about a second rotational axis A2 relative to the first and second bearing housings 14, 16. The second rotational axis A2 is parallel to first rotational axis A1 and is offset from the first rotational axis A1. A thrust bearing 91 may be disposed within the central hub 68 of the second bearing housing 16 and may support an axial end of the second hub 90 of the second scroll member 78.

An Oldham coupling 92 may be keyed to the first and second end plates 80, 86. In some configurations, the Oldham coupling 92 could be keyed to the second end plate 86 and a rotor 100 of the motor assembly 20. The first and second spiral wraps 82, 88 are intermeshed with each other and cooperate to form a plurality of fluid pockets (i.e., compression pockets) therebetween. Rotation of the first scroll member 76 about the first rotational axis A1 and rotation of the second scroll member 78 about the second rotational axis A2 causes the fluid pockets to decrease in size as they move from a radially outer position to a radially inner position, thereby compressing the working fluid therein from the suction pressure to the discharge pressure.

The first end plate 80 may include a suction inlet opening 94 (FIG. 2) providing fluid communication between the suction chamber 26 and a radially outermost one of the fluid pockets. The first scroll member 76 also includes a discharge passage 96 that extends through the first end plate 80 and the first hub 84 and provides fluid communication between a radially innermost one of the fluid pockets and the discharge chamber 30 (e.g., via the discharge passage 54 and the discharge pipe 38). A discharge valve assembly 97 may be disposed within the discharge passage 54. The discharge valve assembly 97 allows working fluid to be discharged from the compression mechanism 18 through the discharge passage 96 into the discharge chamber 30 and prevents working fluid from the discharge chamber 30 from flowing back into to the discharge passage 96.

The second hub 90 of the second scroll member 78 may house a scavenging tube 99 that can scavenge oil from a lubricant sump 95 at the bottom of the first shell body 22 during operation of the compressor 10. That is, oil on the bottom of the first shell body 22 may be drawn up through the scavenging tube 99 and may be routed to one or more moving parts of the compressor 10 via one or more lubricant passages. In some configurations, the second scroll member 78 may include one or more oil injection passages (not shown) through which oil from the scavenging tube 99 can be injected into one of the compression pockets.

The motor assembly 20 may be a ring-motor and may include a composite stator 98 and the rotor 100. The motor stator 98 may be an annular member fixed to an inner diametrical surface 101 of the annular wall 42 of the first bearing housing 14. The stator 98 may surround the first and second end plates 80, 86 and the first and second spiral wraps 82, 88.

The motor rotor 100 may be disposed radially inside of the stator 98 and is rotatable relative to the stator 98. The rotor 100 may include an annular axially extending portion 102 that extends parallel to the first rotational axis A1 and a radially extending portion 104 that extends radially inward (i.e., perpendicular to the first rotational axis A1) from an axial end of the axially extending portion 102. The axially extending portion 102 may surround the first and second end plates 80, 86 and the first and second spiral wraps 82, 88. An inner diametrical surface 106 of the axially extending portion 102 may engage an outer periphery of the first end plate 80. Magnets 108 may be fixed to an outer diametrical surface 110 of the axially extending portion 102, for example. Fasteners 112 may engage the radially extending portion 104 and the first end plate 80 to rotationally and axially fix the rotor 100 to the first scroll member 76. Therefore, when electrical current is provided to the stator 98, the rotor 100 and the first scroll member 76 rotate about the first rotational axis A1. Such rotation of the first scroll member 76 causes corresponding rotation of the second scroll member 78 about the second rotational axis A2 due to the engagement of the Oldham coupling 92 with the first and second scroll members 76, 78.

The radially extending portion 104 of the rotor 100 may include a central aperture 114 through which the second hub 90 of the second scroll member 78 extends. The radially extending portion 104 may also include an annular recess 116 that surrounds the central aperture 114 and the first and second rotational axes A1, A2. A first annular seal 118 and a second annular seal 119 may be at least partially received in the recess 116 and may sealingly engage the radially extending portion 104 and the second end plate 86. The second annular seal 119 may surround the first annular seal 118. In this manner, the first and second annular seals 118, 119, the second end plate 86 and the radially extending portion 104 cooperate to define an annular chamber 120. The annular chamber 120 may receive intermediate-pressure working fluid (at a pressure greater than suction pressure and less than discharge pressure) from an intermediate fluid pocket 122 via a passage 124 in the second end plate 86. Intermediate-pressure working fluid in the annular chamber 120 biases the second end plate 86 in an axial direction (i.e., a direction parallel to the rotational axes A1, A2) toward the first end plate 80 to improve the seal between tips of the first spiral wrap 82 and the second end plate 86 and the seal between tips of the second spiral wrap 88 and the first end plate 80.

Figure 3:
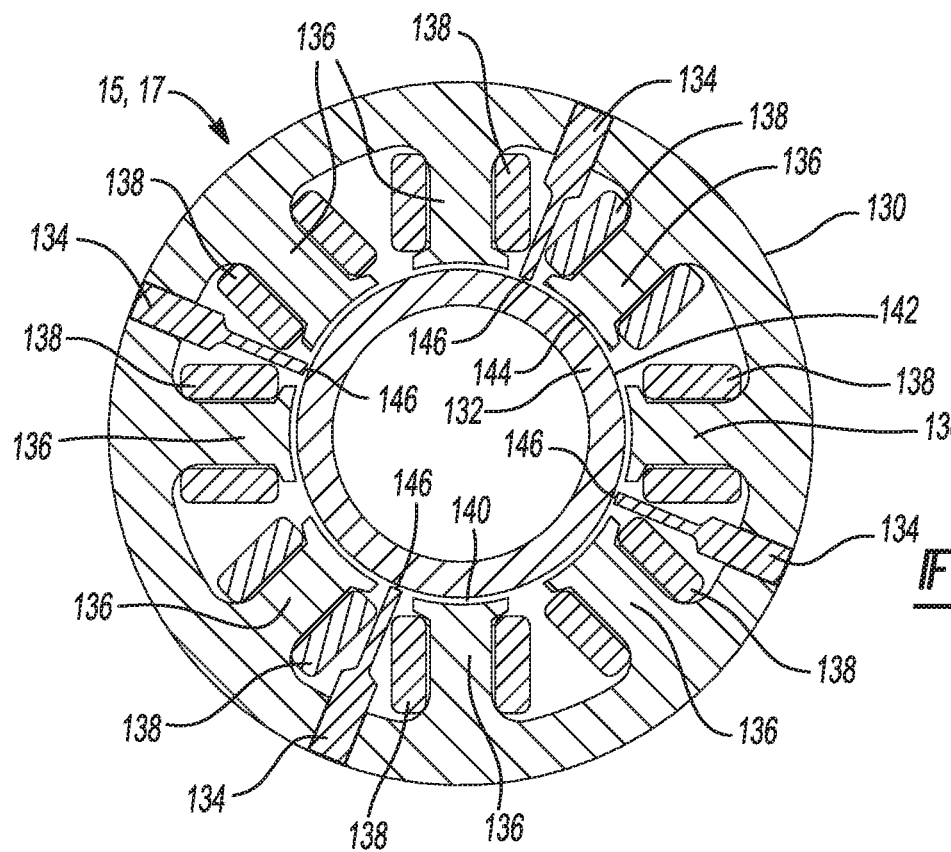
FIG. 3 is a cross-sectional view of a bearing assembly of the compressor of FIG. 1.

Referring now to FIG. 3, the first and second bearing assemblies 15, 17 may be magnetic bearing assemblies that are adjustable before or after the compressor 10 is fully assembled (i.e., before or after the shell assembly 12 is sealed shut) to fine-tune the performance of the compressor 10 and/or to compensate for manufacturing and assembly tolerances, for example. Each of the first and second bearing assemblies 15, 17 may include a bearing stator 130, a bearing rotor 132, and one or more gap sensors 134. The bearing stator 130 may be an annular body having a plurality of poles 136 extending radially inward therefrom. The poles 136 are arranged in a circular pattern that surrounds the bearing rotor 132. Each of the poles 136 defines a radially extending winding axis WA (FIG. 5) about which windings 138 are wrapped. As shown in FIG. 1, the bearing stator 130 of the first bearing assembly 15 may be fixedly attached to an inner diametrical surface of the central hub 50 of the first bearing housing 14, and the bearing stator 130 of the second bearing assembly 17 may be fixedly attached to an inner diametrical surface of the central hub 68 of the second bearing housing 16.

The bearing rotor 132 may be an annular body formed from a magnetic material (e.g., a metallic material) and may be disposed radially within the bearing stator 130. That is, the bearing stator 130 of the first bearing assembly 15 surrounds the bearing rotor 132 of the first bearing assembly 15, and the bearing stator 130 of the second bearing assembly 17 surrounds the bearing rotor 132 of the second bearing assembly 17. An annular air gap 140 is disposed radially between an outer diametrical surface 142 of the bearing rotor 132 and inner diametrical surfaces 144 of the poles 136. As shown in FIG. 1, the bearing rotor 132 of the first bearing assembly 15 receives and is fixedly engaged with the hub 84 of the first scroll member 76, and the bearing rotor 132 of the second bearing assembly 17 receives and is fixedly engaged with the hub 90 of the second scroll member 78. When electrical current is supplied to the windings 138 of the bearing stator 130, magnetic forces are generated that maintain the air gap 140 around the bearing rotor 132 and enable the bearing rotor 132 (and the scroll member 76, 78 to which the bearing rotor 132 is attached) to freely rotate relative to the bearing stator 130 and the corresponding bearing housing 14, 16.

Figure 5:
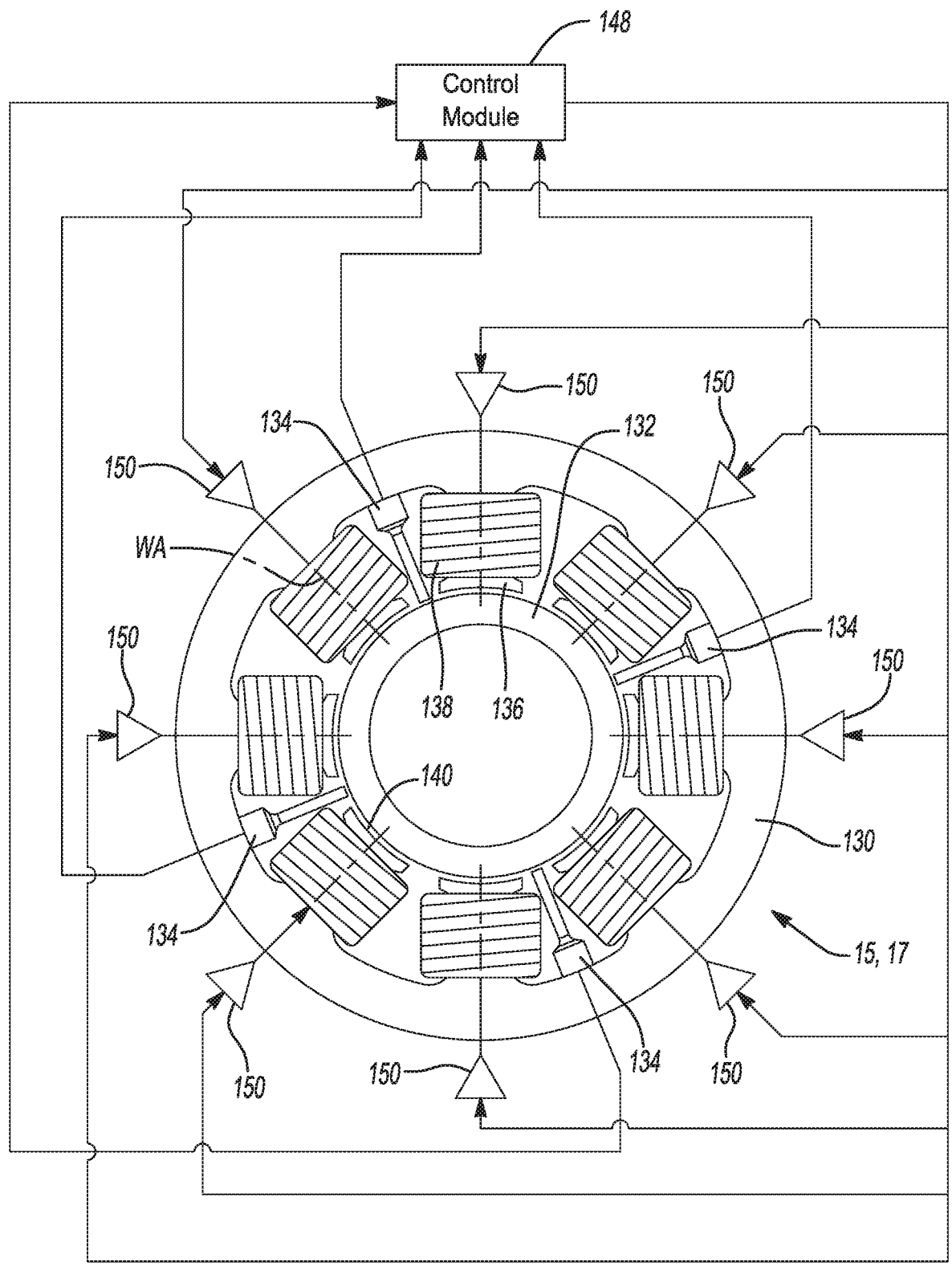
FIG. 5 is a schematic representation of a control system for the bearing assembly of the compressor.

The gap sensors 134 may be mounted to the bearing stator 130 and may extend radially inward from the bearing stator 130 toward the bearing rotor 132. The gap sensors 134 may be arranged in a circular pattern around the bearing rotor 132. Distal tips 146 of the gap sensors 134 may be positioned to be radially aligned with (or nearly radially aligned with) the inner diametrical surfaces 144 of the poles 136. The gap sensors 134 may be in communication with processing circuitry such as control module 148 (FIG. 5). The gap sensors 134 may measure the radial position of the bearing rotor 132 by sensing the radial distance between the distal tips 146 and the outer diametrical surface 142 of the bearing rotor 132. The gap sensors 134 may transmit that radial distance data to the control module 148. The control module 148 may calculate radial distances between the inner diametrical surfaces 144 of the poles 136 and the outer diametrical surface 142 of the bearing rotor 132 based on the data received from the gap sensors 134.

The gap sensors 134 can be any suitable type of sensors. For example, the gap sensors 134 could be capacitive displacement sensors that measure capacitance and changes in capacitance between the gaps sensors 134 and the bearing rotor 132. The control module 148 can calculate the distance (i.e., air gap) between each gap sensor 134 and the bearing rotor 132 based on the capacitance measured by each gap sensor 134. Alternatively, the gap sensors 134 could be optical sensors that measure the distances to the bearing rotor 132 using a laser or other light source.

As shown in FIG. 5, the control module 148 is in communication with the gap sensors 134 and the windings 138 of the first and second bearing assemblies 15, 17. The control module 148 may be or include processing circuitry that can control the amount of electrical current supplied to each of the windings 138 of the bearing stators 130 of the first and second bearing assemblies 15, 17. In this manner, the control module 148 can adjust the position of the bearing rotor 132 attached to the first scroll member 76 (and thus, the position of the first rotational axis A1) relative to the first bearing housing 14 and the position of the bearing rotor 132 attached to the second scroll member 78 (and thus, the position of the second rotational axis A2) relative to the second bearing housing 16. In other words, the control module 148 can adjust the positions of the first and second rotational axes A1, A2 relative to each other. This is accomplished by adjusting the amount of electrical current (i.e., the power) to the windings 138 of one or more of the poles 136.

The windings 138 of each of the poles 136 exerts a magnetic force on the bearing rotor 132 in a direction extending along the winding axis WA of that pole 136. The magnitudes of the magnetic forces along each of the winding axes WA determine the radial position of the bearing rotor 132 relative to the bearing stator 130. Therefore, the radial position of the bearing rotor 132 can be adjusted by changing the magnitude of the magnetic forces at one of the poles 136 or some but not all of the poles 136 relative to the other poles 136 of the bearing stator 130. The magnitudes of the magnetic forces at the poles 136 can be changed, as desired, by changing the amount of electric current (i.e., the amount of electrical power) that is supplied to the poles 136. Therefore, the control module 148 can adjust the position of the bearing rotor 132 relative to the bearing stator 130 by changing the amount of electrical current supplied to the windings 138 of one or some of the poles 136. That is, the control module 148 may control a particular one (or more)

of a plurality of power amplifiers 150 corresponding to the windings 138 of a particular one (or more) of the poles 136 to provide more or less electrical current to the windings 138 of the particular one (or more) of the poles 136. The control module 148 controls the power amplifiers 150 based on data provided to the control module 148 by the gap sensors 134.

The ability to adjust the radial position of one or both of the first and second rotational axes A1, A2 allows the control module 148 to compensate for manufacturing and assembly tolerances in order to ensure that the spiral wraps 82, 88 of the first and second scroll members 76, 78 contact each other at the appropriate points and with an appropriate amount of force to ensure sealing of the compression pockets formed between the spiral wraps 82, 88 without creating too much friction and/or stress. The force with which spiral wraps 82, 88 sealingly engage each other can be adjusted to improve the sound created during operation of the compressor 10. The positioning of the scroll members 76, 78 relative to each other can be adjusted depending upon motor speed and/or other operating parameters to improve flank sealing, flank loading and sound caused by operation of the compressor 10, for example.

Figure 4:
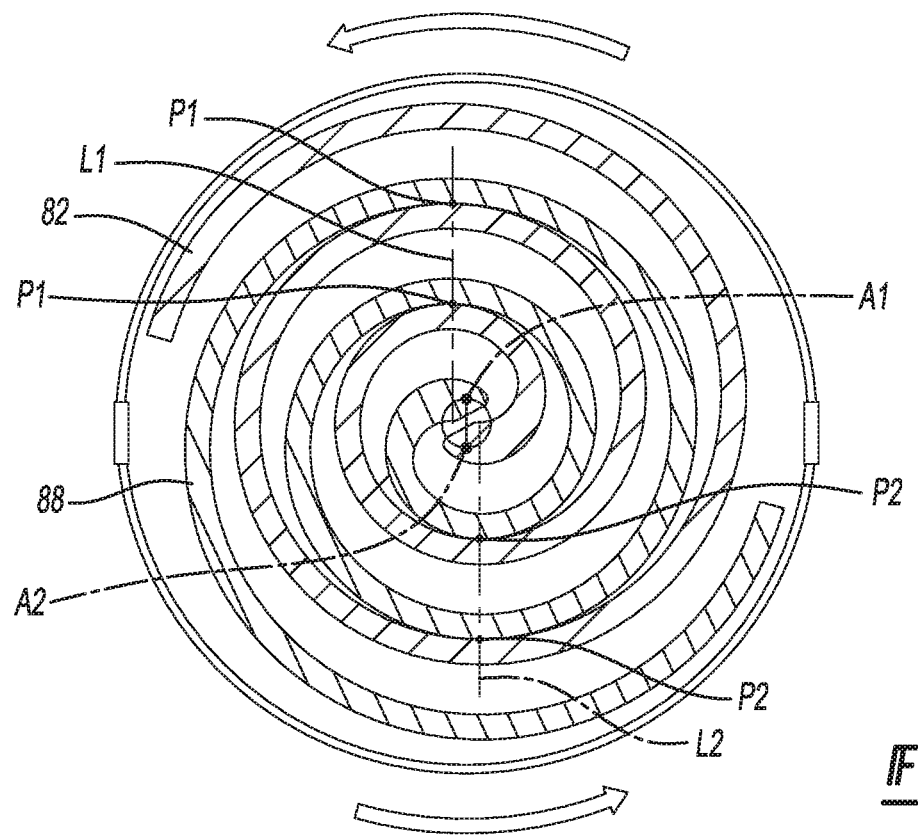
FIG. 4 is a cross-sectional view of spiral wraps of scroll members of the compressor of FIG. 1.

As shown in FIG. 4, the spiral wraps 82, 88 of the co-rotating first and second scroll members 76, 78 contact each other at a plurality of first points P1 and at a plurality of second points P2. The points P1, P2 are the points at which the spiral wraps 82, 88 should contact each other to adequately seal the compression pockets. A line L1 extending through the first points P1 is parallel to and offset from a line L2 that extends through the second points P2. The lines L1 and L2 are also parallel to a line extending through the first and second rotational axes A1, A2. Using the method and structure described above, the control module 148 can adjust the positions of the scroll members 76, 78 and rotational axes A1, A2 (and thus, the positions of the points P1, P2) by adjusting the positions the bearing rotor 132 of one or both of the first and second bearing assemblies 15, 17.

In some configurations, the control module 148 may adjust the radial position of the first scroll member 76 and first rotational axis A1 and/or the radial position of the second scroll member 78 and the second rotational axis A2 using the method and structures described above to radially separate the spiral wraps 82, 88 from each other to provide a gap through which working fluid in the compression pockets can leak into the suction chamber 26 to reduce the capacity of the compressor 10. That is, the control module 148 can selectively move the radial position of the first scroll member 76 and first rotational axis A1 and/or the radial position of the second scroll member 78 and the second rotational axis A2 between a loaded state (e.g., a full-capacity state) in which the spiral wraps 82, 88 are sealingly engaged with each other and an unloaded state (e.g., a zero-capacity or reduced-capacity state) in which the spiral wraps 82, 88 are separated from each other to allow leakage of the working fluid in the compression pockets to the suction chamber 26. The control module 148 can employ a pulse-width-modulation (PWM) control scheme to cycle the compressor 10 between the loaded and unloaded states to generate a modulated capacity output that is between 0% and 100% capacity.

In some configurations, one or both of the first and second bearing assemblies 15, 17 could be a combination radial-axial magnetic bearing assembly that is capable of adjusting the position of one or both of the scroll members 76, 78 in radial directions (as described above) and also in axial directions (i.e., directions along the rotational axes A1, A2). In such configurations, the axial position of one or both of the scroll members 76, 78 can be adjusted to axially separate the scrolls 76, 78 to allow leakage of working fluid from the compression pockets to the suction chamber 26 to reduce the capacity of the compressor 10. That is, the control module 148 can selectively move the axial position of the first scroll member 76 and/or the second scroll member 78 between a loaded state (e.g., a full-capacity state) in which the spiral wraps 82, 88 are sealingly engaged with the end plates 86, 80, respectively, and an unloaded state (e.g., a zero-capacity or reduced-capacity state) in which the spiral wraps 82, 88 are axially separated from the end plates 86, 80, respectively, to allow leakage of the working fluid in the compression pockets to the suction chamber 26. The control module 148 can employ a PWM control scheme to cycle the compressor 10 between the loaded and unloaded states to generate a modulated capacity output that is between 0% and 100% capacity.

Furthermore, adjustments to the axial positioning of one or both of the scroll members 76, 78 can be made to adjust the loading of the tips of the spiral wraps 82, 88 against the end plates 86, 80 to improve sealing and friction therebetween.

While the compressor 10 described above and shown in the figures has first and second magnetic bearing assemblies 15, 17 that can adjust the positions of the first and second rotational axes A1, A2, in some embodiments, the compressor 10 may include only one magnetic bearing assembly 15 or 17 operable to adjust the position of the one of the scroll members 76, 78. In such embodiments, one of the magnetic bearing assemblies 15, 17 may be replaced with a conventional (i.e., non-adjustable) bearing assembly.

With reference to FIGS. 6-9, another compressor 210 is provided that may include a shell assembly 212, a first bearing housing 214, a first bearing assembly 215, a second bearing housing 216, a second bearing assembly 217, a compression mechanism 218, and a motor assembly 220. The compressor 210 may be a high-side sumpless compressor (i.e., the first and second bearing housings 214, 216, first and second bearing assemblies 215, 217, compression mechanism 218, and motor assembly 220 may be disposed within a discharge chamber 230 defined by the shell assembly 212; and the compressor 210 does not include a lubricant sump).

The shell assembly 212 may include a first shell body 222 and a second shell body 224 that is fixed to the first shell body 222 (e.g., via welding, press fit, etc.). The first and second shell bodies 222, 224 may cooperate with each other to define the discharge chamber 230. A suction inlet fitting 228 may extend through the second shell body 224. A discharge outlet fitting 232 may engage the first shell body 222 and may be in fluid communication with the discharge chamber 230. In some configurations, a discharge valve (e.g., a check valve) may be disposed within the discharge outlet fitting 232.

The first bearing housing 214 may include an annular wall 242 and a radially extending flange portion 244 disposed at an axial end of the annular wall 242. The annular wall 242 may include an outer rim 248 that may be fixed to the second shell body 224. The flange portion 244 may include a central hub 250 that receives the first bearing assembly 215 (e.g., a roller bearing assembly). The central hub 250 may define a suction passage 254 that is fluidly coupled with the suction inlet fitting 228. The compression mechanism 218 may draw suction-pressure working fluid from the suction inlet fitting 228 through the suction passage 254. A suction valve assembly 229 (e.g., a check valve) may be disposed within the suction passage 254. The suction valve assembly 229 allows suction-pressure working fluid to flow through the suction passage 254 toward the compression mechanism 218 and prevents the flow of working fluid in the opposite direction. The first bearing housing 214 may include passages 256 that extend through the annular wall 242 and one or more passages 257 that extend through the flange portion 244 to allow lubricant and working fluid discharged from the compression mechanism 218 to circulate throughout the shell assembly 212 to cool and lubricate moving parts of the compressor 210.

The second bearing housing 216 may include a central hub 268 and a flange portion 267 that extends radially outward from the central hub 268. The central hub 268 may receive the second bearing assembly 217. The flange portion 267 may be fixedly attached to an axial end of the annular wall 242 of the first bearing housing 214 via a plurality of fasteners 270, for example. Passages 272 may extend through the flange portion 267 and may be in fluid communication with the passages 256 in the first bearing housing 214 to allow working fluid and lubricant to circulate throughout the shell assembly 212.

The compression mechanism 218 may include a first compression member and a second compression member that cooperate to compress working fluid therebetween. For example, the compression mechanism 218 may be a co-rotating scroll compression mechanism in which the first compression member is a first scroll member (e.g., a driven scroll member) 276 and the second compression member is a second scroll member (e.g., an idler scroll member) 278. In other configurations, the compression mechanism 218 could be another type of compression mechanism, such as an orbiting scroll compression mechanism, a rotary compression mechanism, a screw compression mechanism, a Wankel compression mechanism or a reciprocating compression mechanism, for example.

The first scroll member 276 may include a first end plate 280, a first spiral wrap 282 extending from one side of the first end plate 280, and a first hub 284 extending from the opposite side of the first end plate 280. The second scroll member 278 may include a second end plate 286, a second spiral wrap 288 extending from one side of the second end plate 286, and a second hub 290 extending from the opposite side of the second end plate 286.

The first hub 284 of the first scroll member 276 is received within the central hub 250 of the first bearing housing 214. A seal 285 is disposed within the central hub 250 and sealing engages the central hub 250 and the first hub 284. A portion of the first end plate 280 is also received within the central hub 250 and is supported by the first bearing housing 214 and the first bearing assembly 215 for rotation about a first rotational axis A1 relative to the first and second bearing housings 214, 216. The second hub 290 of the second scroll member 278 is received within the central hub 268 of the second bearing housing 216 and is supported by the second bearing housing 216 and the second bearing assembly 217 for rotation about a second rotational axis A2 relative to the first and second bearing housings 214, 216. The second rotational axis A2 is parallel to first rotational axis A1 and is offset from the first rotational axis A1.

An Oldham coupling may be keyed to the second end plate 286 and a rotor 300 of the motor assembly 220. In some configurations, the Oldham coupling could be keyed to the first and second end plates 280, 286. The first and second spiral wraps 282, 288 are intermeshed with each other and cooperate to form a plurality of fluid pockets (i.e., compression pockets) therebetween. Rotation of the first scroll member 276 about the first rotational axis A1 and rotation of the second scroll member 278 about the second rotational axis A2 causes the fluid pockets to decrease in size as they move from a radially outer position to a radially inner position, thereby compressing the working fluid therein from the suction pressure to the discharge pressure.

The first scroll member 276 may include an axially extending suction passage 296 that extends through the first hub 284 and into the first end plate 280. Radially extending suction passages 297 formed in the first end plate 280 extend radially outward from the axially extending suction passage 296 and provide fluid communication between the axially extending suction passage 296 and radially outermost fluid pockets. Accordingly, during operation of the compressor 210, suction-pressure working fluid can be drawn into the suction inlet fitting 228, through the suction passage 254 of the first bearing housing 214, through the axially extending suction passage 296, and then through the radially extending suction passages 297 to the radially outermost fluid pockets defined by the spiral wraps 282, 288.

The second scroll member 278 may include one or more discharge passages 294 that extend through the second end plate 286 and the second hub 290 and provide fluid communication between a radially innermost one of the fluid pockets and the discharge chamber 230. The second bearing housing 216 may include one or more discharge openings 293 providing fluid communication between the discharge passage 294 and the discharge chamber 230.

The structure and function of the motor assembly 220 may be similar or identical to that of the motor assembly 20. Therefore, similar features may not be described in detail again. Like the motor assembly 20, the motor assembly 220 may be a ring motor including a composite stator 295 and a rotor 300. The stator 295 may be fixed to the annular wall 242 of the first bearing housing 214 and may surround the first and second end plates 280, 286 and the first and second spiral wraps 282, 288.

The rotor 300 may be disposed radially inside of the stator 295 and is rotatable relative to the stator 295. The rotor 300 may include an annular axially extending portion 302 and a radially extending portion 304. The axially extending portion 302 may surround the first and second end plates 280, 286 and the first and second spiral wraps 282, 288. The axially extending portion 302 may engage an outer periphery of the first end plate 280. When electrical current is provided to the stator 295, the rotor 300 and the first scroll member 276 rotate about the first rotational axis A1. Such rotation of the first scroll member 276 causes corresponding rotation of the second scroll member 278 about the second rotational axis A2, as described above.

An annular seal 318 may be received in a recess in the radially extending portion 304 and may sealingly engage the radially extending portion 304 and the second end plate 286. The annular seal 318, the first and second end plates 280, 286 and the radially extending portion 304 cooperate to define an annular chamber 320. The annular chamber 320 may receive intermediate-pressure working fluid (at a pressure greater than suction pressure and less than discharge pressure) from an intermediate fluid pocket 322 via a passage in the second end plate 286. Intermediate-pressure working fluid in the annular chamber 320 biases the second end plate 286 in an axial direction (i.e., a direction parallel to the rotational axes A1, A2) toward the first end plate 280 to improve the seal between tips of the first spiral wrap 282 and the second end plate 286 and the seal between tips of the second spiral wrap 288 and the first end plate 280.

The second bearing assembly 217 may be a magnetic bearing assembly that is operable to radially adjust a position of the second scroll member 278 relative to the first scroll member 276 to fine-tune the performance of the compressor 210, to compensate for manufacturing and assembly tolerances, and/or to modulate capacity of the compressor 210, as described above with respect to the bearing assemblies 15, 17. The second bearing assembly 217 is also operable during operation of the compressor 210 to axially separate the first and second scroll members 276, 278 to modulate the capacity of the compressor 210.

The second bearing assembly 217 may include a bearing stator 330, a bearing rotor 332, and a plurality of gap sensors (similar or identical to gap sensors 134 described above). The bearing stator 330 may include a stator core 334, a permanent magnet ring 336, a first pole piece 338, a second pole piece 340, an annular support member 342, a plurality of radial control windings 344, a first axial control winding 346, and a second axial control winding 348.

The stator core 334 may be an annular body having a plurality of poles 350 (FIGS. 8 and 9) extending radially inward therefrom. The poles 350 are arranged in a circular pattern that surrounds the bearing rotor 332. Each of the poles 350 defines a radially extending winding axis WA (FIG. 8) about which a corresponding one of the radial control windings 344 is wrapped.

The permanent magnet ring 336 may be fixed to and extend around the outer diametrical surface of the stator core 334. The annular support member 342 may be fixed to and extend around the outer diametrical surface of the permanent magnet ring 336. The first and second pole pieces 338, 340 may be annular bodies that are attached to opposite axial ends of the annular support member 342 and encircle the hub 290 of the second scroll member 278. The bearing rotor 332, stator core 334, permanent magnet ring 336, radial control windings 344, and axial control windings 346, 348 may be disposed axially between the first and second pole pieces 338, 340. The permanent magnet ring 336 and the first and second pole pieces 338, 340 may be fixed to an inner diametrical surface of the central hub 268 of the second bearing housing 216.

Figure 9:
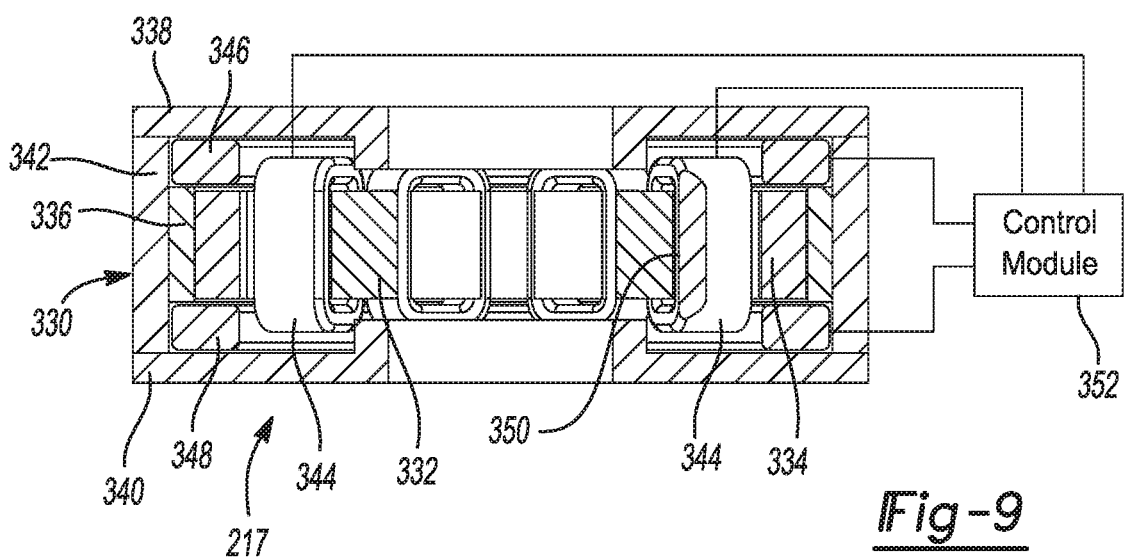
FIG. 9 is another cross-sectional view of the bearing assembly of the compressor of FIGS. 6 and 7.

The first and second axial control windings 346, 348 may be annular windings that encircle the second rotational axis A2 and the hub 290 of the second scroll member 278. The stator core 334 and the permanent magnet ring 336 may be disposed axially between the first and second axial control windings 346, 348 (i.e., the first and second axial control windings 346, 348 may be disposed on opposite axial ends of the stator core 334 and the permanent magnet ring 336). The radial control windings 344 and the first and second axial control windings 346, 348 may be in communication with a control module 352 (FIG. 9).

Figure 6:
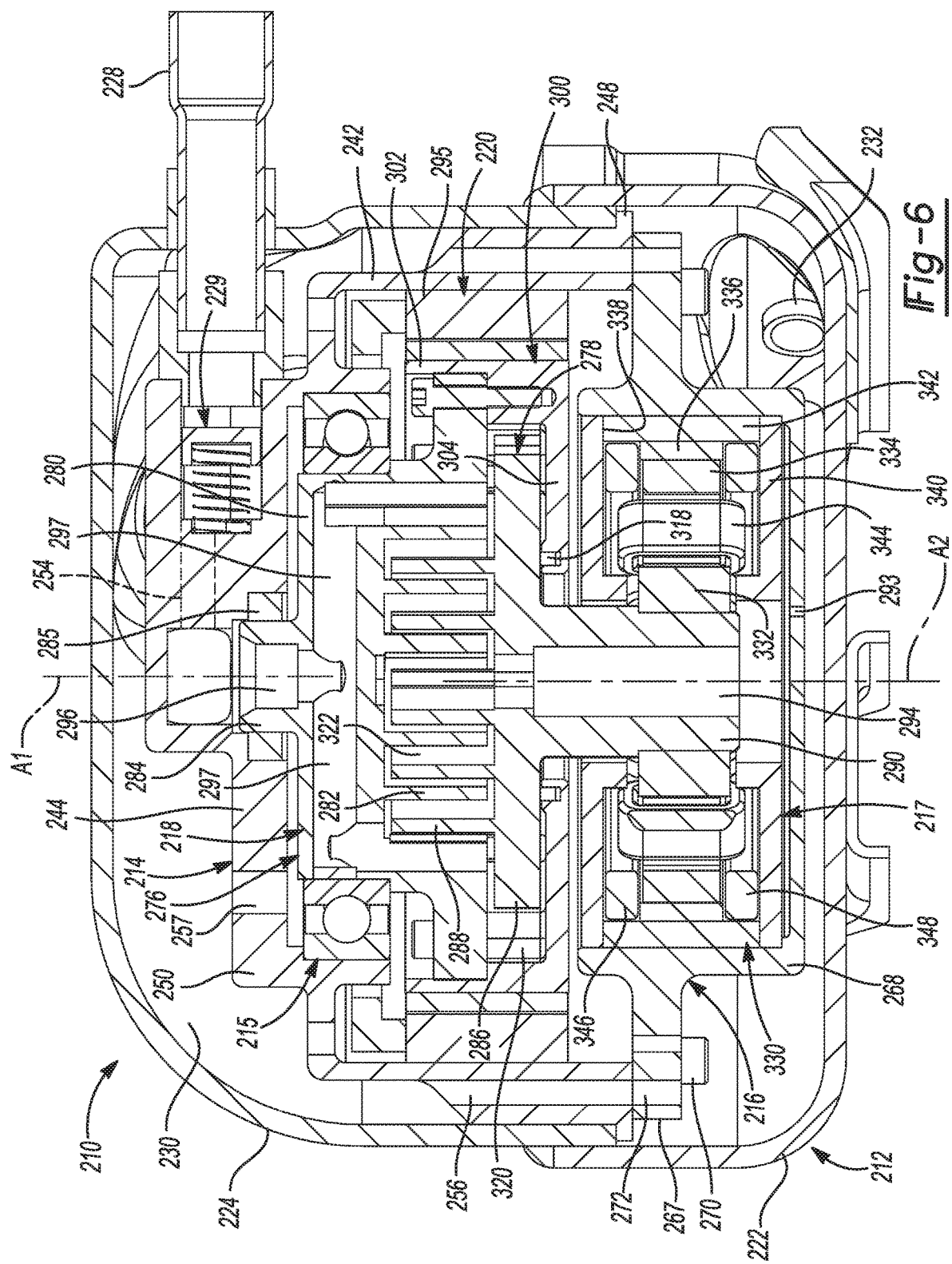
FIG. 6 is a cross-sectional view of another compressor in a reduced-capacity state.
Figure 7:
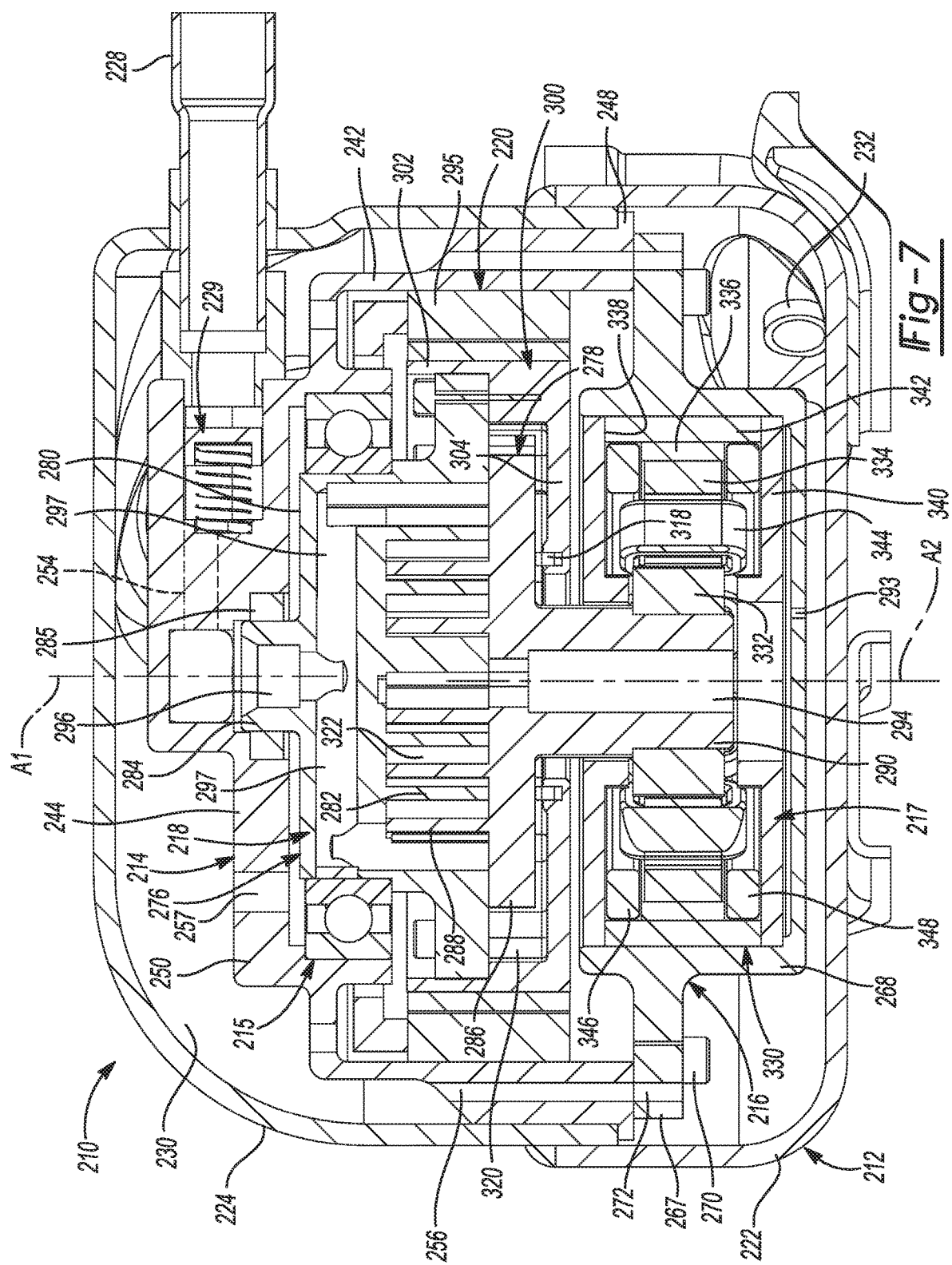
FIG. 7 is a cross-sectional view of the compressor of FIG. 6 in a full-capacity state.
Figure 8:
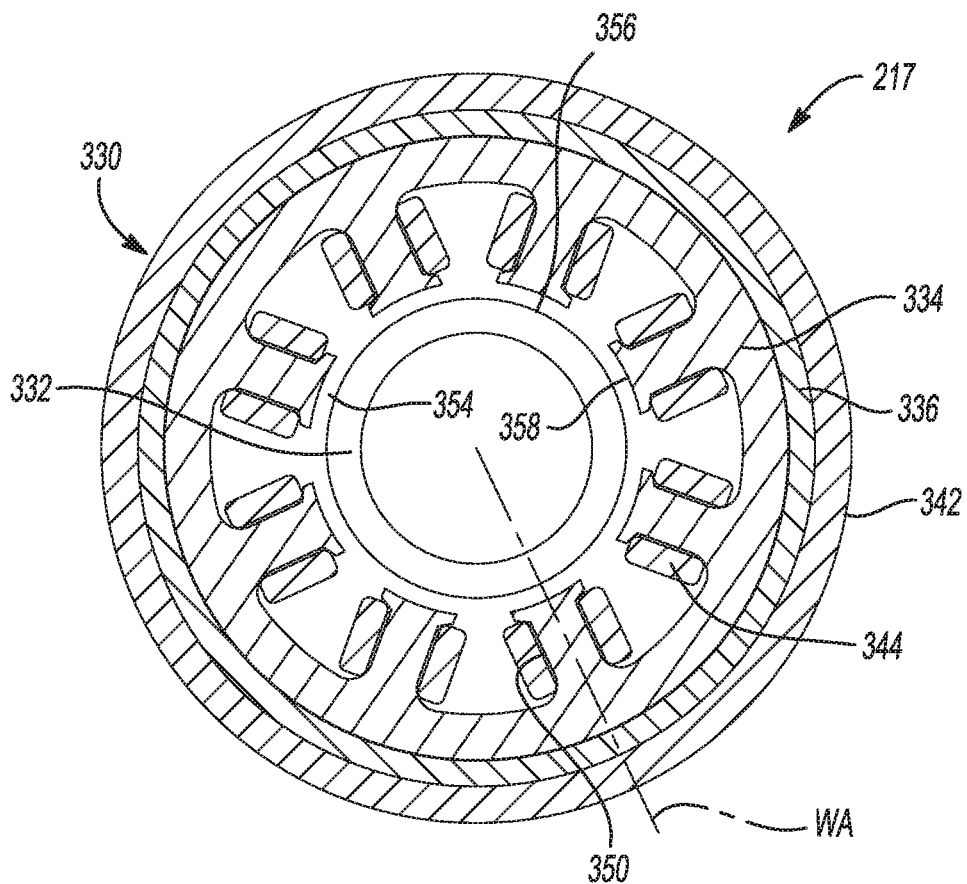
FIG. 8 is a cross-sectional view of a bearing assembly of the compressor of FIGS. 6 and 7.

The bearing rotor 332 may be an annular body formed from a magnetic material (e.g., a metallic material) and may be disposed radially within the stator core 334. That is, the stator core 334 surrounds the bearing rotor 332. As shown in FIG. 8, an annular air gap 354 is disposed radially between an outer diametrical surface 356 of the bearing rotor 332 and inner diametrical surfaces 358 of the poles 350. As shown in FIGS. 6 and 7, the bearing rotor 332 receives and is fixedly engaged with the hub 290 of the second scroll member 278. When electrical current is supplied to the radial control windings 344 of the bearing stator 330, magnetic forces are generated that maintain the air gap 354 around the bearing rotor 332 and enable the bearing rotor 332 (and the scroll member 278 to which the bearing rotor 332 is attached) to freely rotate relative to the bearing stator 330 and the second bearing housing 216.

As described above with respect to the compressor 10, gap sensors may be mounted to the bearing stator 330 and may extend radially inward from the bearing stator 330 toward the bearing rotor 332. The gap sensors may be arranged in a circular pattern around the bearing rotor 332 and may be in communication with the control module 352. As described above, the gap sensors may measure the radial position of the bearing rotor 332 by sensing the radial distance between the gap sensor and the outer diametrical surface 356 of the bearing rotor 332. The gap sensors may transmit that radial distance data to the control module 352. The control module 352 may calculate radial distances between the inner diametrical surfaces 358 of the poles 350 and the outer diametrical surface 356 of the bearing rotor 332 based on the data received from the gap sensors.

As described above, the control module 352 may be or include processing circuitry that can control the amount of electrical current supplied to each of the radial control windings 344 of the bearing stator 330. In this manner, the control module 352 can adjust the radial position of the bearing rotor 332 (and thus, the position of the second scroll member 278 and the second rotational axis A2) relative to the second bearing housing 216 and the first scroll member 276. In other words, the control module 352 can adjust the positions of the first and second rotational axes A1, A2 relative to each other. This is accomplished by adjusting the amount of electrical current (i.e., the power) to selected ones of the radial control windings 344, as described above.

The control module 352 can also adjust the amount of electrical current to either or both of the first and second axial control windings 346, 348 to adjust the axial position of the second scroll member 278 relative to the first scroll member 276 to selectively axially separate the scrolls 276, 278 to allow leakage of working fluid from the compression pockets to reduce the capacity of the compressor 210. That is, the control module 352 can selectively move the axial position of the second scroll member 278 between a loaded state (e.g., a full-capacity state; shown in FIG. 7) in which the spiral wraps 282, 288 are sealingly engaged with the end plates 286, 280, respectively, and an unloaded state (e.g., a zero-capacity or reduced-capacity state; FIG. 6) in which the spiral wraps 282, 288 are axially separated from the end plates 286, 280, respectively, to allow leakage of the working fluid in the compression pockets. The control module 352 can employ a PWM control scheme to cycle the compressor 210 between the loaded and unloaded states to generate a modulated capacity output that is between 0% and 100% capacity.

Furthermore, adjustments to the axial positioning of the second scroll member 278 can be made to adjust the loading of the tips of the spiral wraps 282, 288 against the end plates 286, 280 to improve sealing and friction therebetween.

While the first bearing assembly 215 is described above as being a roller bearing assembly, in some configurations, the first bearing assembly 215 could be a magnetic bearing assembly (similar or identical to the second bearing assembly 217) that is operable to radially and axially adjust a position of the first scroll member 276. In some of such configurations, the second bearing assembly 217 could be a magnetic bearing assembly (as described above), and in others of such configurations, the second bearing assembly 217 could be a roller bearing assembly.

The entire disclosures of each of Applicant's commonly owned U.S. Patent Application Publication No. 2018/0223843, U.S. Patent Application Publication No. 2018/0224171, U.S. Patent Application Publication No. 2018/

0223842, and U.S. Patent Application Publication No. 2018/0223849 are incorporated herein by reference.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The figures and descriptions above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressor comprising:
   a first scroll member;
   a second scroll member cooperating with the first scroll member to define a compression pocket therebetween;
   a bearing assembly supporting one of the first and second scroll members for rotation about a rotational axis, the bearing assembly including an annular bearing rotor and an annular bearing stator, the bearing stator surrounding the bearing rotor and including axial control windings; and
   processing circuitry controlling electrical current supplied to the axial control windings to adjust an axial position of the bearing rotor relative to the bearing stator, wherein the processing circuitry is configured to modulate the compressor between a full-capacity state and a reduced-capacity state by controlling the electrical current supplied to the axial control windings to axially move the one of the first and second scroll members relative to the other one of the first and second scroll members between a first position corresponding to the full-capacity state and a second position corresponding to the reduced-capacity state.

2. The compressor of claim 1, wherein the bearing stator includes a plurality of poles each having a radial control winding, and wherein the processing circuitry controls electrical current supplied to the radial control windings to adjust a radial position of the bearing rotor relative to the bearing stator.

3. The compressor of claim 2, wherein the one of the scroll members includes a hub, and wherein the bearing rotor is attached to the hub.

4. The compressor of claim 3, further comprising a motor assembly including a motor rotor engaging the first scroll member, wherein the motor rotor surrounds a first end plate of the first scroll member and a second end plate of the second scroll member.

5. A compressor comprising:
a first compression member;
a second compression member cooperating with the first compression member to define a compression pocket therebetween;
a first bearing assembly supporting the first compression member for rotation about a first rotational axis, the first bearing assembly including an annular bearing rotor and an annular bearing stator, the bearing stator surrounding the bearing rotor and including a plurality of poles each having a winding;
a second bearing assembly supporting the second compression member for rotation about a second rotational axis that is parallel to the first rotational axis and offset from the first rotational axis;
a gap sensor measuring a radial position of the bearing rotor relative to the bearing stator; and
processing circuitry in communication with the gap sensor and controlling electrical current supplied to the windings based on the radial position measured by the gap sensor to adjust the radial position of the bearing rotor relative to the bearing stator,
wherein the processing circuitry is configured to modulate the compressor between a full-capacity state and a reduced-capacity state by controlling the electrical current supplied to the windings, wherein controlling the electrical current supplied to the windings modulates the radial position of the first compression member relative to the second compression member, and wherein modulating the radial position of the first compression member relative to the second compression member modulates spiral wraps of the first and second compression members between a sealingly engaged state and a radially separated state.

6. The compressor of claim 5, further comprising a plurality of gap sensors positioned around the circumference of the bearing rotor and each measuring a corresponding radial distance between the bearing rotor and the bearing stator, and wherein the processing circuitry is in communication with the plurality of gap sensors and controls electrical current to the windings based on data received from the plurality of gap sensors.

7. The compressor of claim 5, wherein the first and second compression members are first and second scroll members, respectively.

8. The compressor of claim 5, wherein the bearing stator includes axial control windings in communication with the processing circuitry, and wherein the processing circuitry controls electrical current supplied to the axial control windings to adjust the axial position of the bearing rotor relative to the bearing stator.

9. The compressor of claim 5, wherein the first compression member includes a first hub received in and fixed relative to the bearing rotor.

10. The compressor of claim 9, wherein the second compression member includes a second hub rotatably supported by the second bearing assembly.

11. The compressor of claim 10, further comprising a motor assembly including a motor rotor engaging the first compression member and disposed axially between the first and second bearing assemblies.

12. The compressor of claim 11, wherein the motor rotor surrounds a first end plate of the first compression member and a second end plate of the second compression member.

13. The compressor of claim 12, wherein the first and second bearing assemblies are disposed within first and second bearing housings, respectively, and wherein the motor assembly includes a motor stator surrounding the motor rotor and disposed axially between the first and second bearing housings.

14. The compressor of claim 13, wherein the motor rotor includes a radially extending portion that extends radially outward relative to the first rotational axis and an axially extending portion that extends parallel to the first rotational axis.

15. The compressor of claim 14, wherein the axially extending portion engages the first end plate and surrounds the first compression member.

16. The compressor of claim 15, further comprising a seal engaging the motor rotor and the second end plate, wherein the radially extending portion engages the seal, and wherein the second end plate is disposed between the second end plate and the radially extending portion in a direction extending along the first rotational axis.

17. A compressor comprising:
a first compression member;
a second compression member cooperating with the first compression member to define a compression pocket therebetween;
a first magnetic bearing assembly supporting the first compression member for rotation about a first rotational axis, the first magnetic bearing assembly including an annular first bearing rotor and an annular first bearing stator, the first bearing stator surrounding the first bearing rotor and including a plurality of first poles each having a winding;
a second magnetic bearing assembly supporting the second compression member for rotation about a second rotational axis that is parallel to the first rotational axis and offset from the first rotational axis, the second magnetic bearing assembly including an annular second bearing rotor and an annular second bearing stator, the second bearing stator surrounding the second bearing rotor and including a plurality of second poles each having a winding;
a first gap sensor measuring a radial position of the first bearing rotor relative to the first bearing stator;

a second gap sensor measuring a radial position of the second bearing rotor relative to the second bearing stator; and processing circuitry in communication with the first and second gap sensors and controlling electrical current supplied to the windings of the first and second poles based on the radial positions measured by the first and second gap sensors to adjust the radial positions of the first and second rotational axes relative to each other, wherein the processing circuitry is configured to modulate the compressor between a full-capacity state and a reduced-capacity state by controlling the electrical current supplied to the windings of the first and second poles, wherein controlling the electrical current supplied to the windings modulates the radial position of the first compression member relative to the second compression member, and wherein modulating the radial position of the first compression member relative to the second compression member modulates spiral wraps of the first and second compression members between a sealingly engaged state and a radially separated state.

18. The compressor of claim 17, further comprising:

a plurality of first gap sensors positioned around the circumference of the first bearing rotor and each measuring a corresponding radial distance between the first bearing rotor and the first bearing stator; and a plurality of second gap sensors positioned around the circumference of the second bearing rotor and each measuring a corresponding radial distance between the second bearing rotor and the second bearing stator, wherein the processing circuitry is in communication with the plurality of first gap sensors and the plurality of second gap sensors and controls electrical current to the windings of the first and second bearing stators based on data received from the plurality of first gap sensors and the plurality of second gap sensors.

19. The compressor of claim 17, wherein the first and second compression members are first and second scroll members, respectively.

20. The compressor of claim 17, wherein the first compression member includes a first hub received in and fixed relative to the first bearing rotor, and wherein the second compression member includes a second hub received in and fixed relative to the second bearing rotor.

21. The compressor of claim 20, further comprising a motor assembly including a motor rotor engaging the first compression member and disposed axially between the first and second magnetic bearing assemblies.

22. The compressor of claim 21, wherein the motor rotor surrounds a first end plate of the first compression member and a second end plate of the second compression member.

23. The compressor of claim 22, wherein the first and second magnetic bearing assemblies are disposed within first and second bearing housings, respectively, and wherein the motor assembly includes a motor stator surrounding the motor rotor and disposed axially between the first and second bearing housings.

24. The compressor of claim 23, wherein the motor rotor includes a radially extending portion that extends radially outward relative to the first rotational axis and an axially extending portion that extends parallel to the first rotational axis.

25. The compressor of claim 24, wherein the axially extending portion engages the first end plate and surrounds the second compression member.

* * * * *